(12) United States Patent
Lake, Jr. et al.

(10) Patent No.: US 6,586,007 B2
(45) Date of Patent: Jul. 1, 2003

(54) POLYOLEFIN ADDITIVE COMPOSITION COMPRISING 3,4-DIMETHYL DIBENZYLIDENE SORBITOL AND RHO-METHYL DIBENZYLIDENE

(75) Inventors: K. David Lake, Jr., Spartanburg, SC (US); Nathan A. Mehl, Moore, SC (US); Christopher Thomas Kochanowicz, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/785,824

(22) Filed: Feb. 16, 2001

(65) Prior Publication Data

US 2002/0161076 A1 Oct. 31, 2002

(51) Int. Cl.$^7$ .................................................. A61K 9/14
(52) U.S. Cl. ........................................ 424/486; 424/484
(58) Field of Search ...................... 524/108; 549/364; 424/486, 484

(56) References Cited

U.S. PATENT DOCUMENTS

| 3,721,682 A | 3/1973 | Murai et al. | 260/340.7 |
| 4,371,645 A | 2/1983 | Mahaffey, Jr. | 524/108 |
| 4,429,140 A | 1/1984 | Murai et al. | 549/370 |
| 4,562,265 A | 12/1985 | Machell | 549/364 |
| 4,902,807 A | 2/1990 | Kobayashi et al. | 549/364 |
| 5,049,605 A | 9/1991 | Rekers | 524/108 |
| 5,310,950 A * | 5/1994 | Mannion | 549/364 |
| 5,731,474 A | 3/1998 | Scrivens et al. | 568/592 |
| 5,856,385 A * | 1/1999 | Mehrer et al. | 524/108 |

FOREIGN PATENT DOCUMENTS

| EP | 0 911 365 | * | 4/1999 |
| JP | 1996-199003 |   | 8/1996 |
| JP | 1996-325415 |   | 12/1996 |

* cited by examiner

Primary Examiner—Thurman K. Page
Assistant Examiner—Blessing Fubara
(74) Attorney, Agent, or Firm—Terry T. Moyer; William S. Parks

(57) ABSTRACT

A specific combination of two different polyolefin clarifying and nucleating agents, namely 3,4-dimethyldibenzylidene sorbitol and p-methyldibenzylidene sorbitol is provided. Such a combination surprisingly provides improved clarification and crystallization temperatures to polypropylene articles and formulations, better than bis-p-methyldibenzylidene sorbitol alone and equivalent or better than 3,4-dimethyldibenzylidene sorbitol. Such a combination of compounds thus permits the utilization of a new additive for the purpose of modifying polyolefin properties, such as polypropylene clarification and nucleation. The inventive combination may be introduced within any polyolefin composition, again preferably polypropylene, which may then be molded into any shape or form. A method of producing a polyolefin plastic utilizing the inventive combination of compounds is also provided.

22 Claims, No Drawings

US 6,586,007 B2

POLYOLEFIN ADDITIVE COMPOSITION COMPRISING 3,4-DIMETHYL DIBENZYLIDENE SORBITOL AND RHO-METHYL DIBENZYLIDENE

FIELD OF THE INVENTION

This invention relates to a specific combination of two different polyolefin clarifying and nucleating agents, namely bis-3,4-dimethyldibenzylidene sorbitol and bis-p-methyldibenzylidene sorbitol. Such a combination surprisingly provides improved clarification and crystallization temperatures to polypropylene articles and formulations, better than bis-p-methyldibenzylidene sorbitol alone and equivalent or better than 3,4-dimethyldibenzylidene sorbitol alone. Such a combination of compounds thus permits the utilization of a new additive for the purpose of modifying polyolefin properties, such as polypropylene clarification and nucleation. The inventive combination may be introduced within any polyolefin composition, again preferably polypropylene, which may then be molded into any shape or form. A method of producing a polyolefin plastic utilizing the inventive combination of compounds is also provided.

BACKGROUND OF THE PRIOR ART

Dibenzylidene sorbitol acetals ("DBS"), substituted DBS, such as can be made with alkyl substituted aromatic aldehydes, and related acetals have found utility as nucleating agents, clarifying agents, gelling agents, processing aids, and strength modifiers in polyolefin resins, polyester resins, deodorant, and antiperspirant compositions; hydrocarbon fuels; waste liquids, especially those containing organic impurities; and paint.

Such compounds are utilized to provide nucleation sites for polyolefin crystal growth during cooling of a molten formulation. Without being limited to one specific scientific theory, it is believed that DBS compounds form fibrous networks within the molten polyolefin (such as polypropylene) at a temperature well above that required for polyolefin crystal formation. The fibrous networks appear to act as sites for more ordered and faster polyolefin crystallization during cooling. During the process of crystallization, polymer crystals organize into larger superstructures which are referred to as spherulites. The more uniform, and preferably smaller, the spherulite size, the reduced possibility for light to be scattered. In such a manner, optical opacity of the polyolefin article itself can be controlled. Thus, DBS compounds are very important to the polyolefin industry in order to provide such desired nucleation and clarification properties.

DBS derivative compounds are typically prepared by the condensation reaction of two moles of an aromatic aldehyde with one mole of a polyhydric alcohol, such as xylitol or sorbitol. Examples of suitable processes may be found in Murai et al., U.S. Pat. No. 3,721,682; Murai et al., U.S. Pat. No. 4,429,140; Machell, U.S. Pat. No. 4,562,265; Kobayashi et al., U.S. Pat. No. 4,902,807; and Scrivens et al., U.S. Pat. No. 5,731,474. All of these references are hereby incorporated by reference in their entirety.

Specific clarifying and nucleating agents for polyolefins include bis-3,4-dimethyldibenzylidene sorbitol (3,4-DMDBS) and bis-p-methyldibenzylidene sorbitol (MDBS). These specific compounds and polyolefins containing such compounds have been taught previously in U.S. Pat. No. 4,371,645 to Mahaffey and U.S. Pat. No. 5,049,605 to Rekers, respectively. Such compounds are thus individually well known as polyolefin additives and exhibit excellent low haze measurements within polyolefins (as low as about 8.0% for 3,4-DMDBS and about 10% for MDBS in random polypropylene copolymer injection molded 50 mil thick plaques having 2000 ppm of clarifier added).

However, there are drawbacks from utilizing MDBS as a clarifying agent since degradation of such a compound into the benzaldehyde and sorbitol components creates a problem with migration of such benzaldehydes from the target polyolefin. In such a situation, foul odors and tastes are generated such that the target polyolefin is limited in its end-use function to non-food contact applications. To combat this, Milliken & Company developed 3,4-DMDBS. Such a compound appears to suffer from the same type of degradation possibilities; however, the resultant benzaldehyde, being 3,4-dimethyl substituted, does not create the same organoleptic problems as its p-methylbenzaldehyde counterpart. As a result, 3,4-DMDBS has become the primary clarifying agent throughout the polyolefin market.

Unfortunately, though, 3,4-DMDBS is relatively expensive to manufacture. The manufacturing costs required to produce 3,4-DMDBS are above those for MDBS. As a result, there remains a great desire to develop a more cost-effective, yet acceptable clarifying agent or composition for polyolefins which exhibits similar haze results as either of the two compounds individually. To date, there has been no teaching or fair suggestion for any such improvements to lower the amount of 3,4-DMDBS in order to reduce the costs of such a composition solely comprising such a polyolefin clarifying agent without sacrificing clarification ability. There does exist a combination of 3,4-DMDBS with bis(p-chlorobenzylidene) sorbitol in Japanese Application Hei 8[1996]-199003 to Kobayashi; however, such a composition provides deleterious results from an organoleptic perspective. Japanese Application Hei 8[1996]-32415, also to Kobayashi, teaches a combination of MDBS with bis-p-chlorodibenzylidene sorbitol as a polyolefin additive as well. Again, organoleptics are problematic with such a composition. Neither teaching shows or fairly suggests the combination of 3,4-DMDBS and MDBS. The only other teachings concerning such polyolefin clarifying compounds have been as individually utilized compounds within polyolefin compositions and articles, as noted above. Thus, there remains a desire to provide a more cost-effective but similarly performing clarifying agent comprising the excellent clarifier 3,4-DMDBS.

OBJECTS OF THE INVENTION

Therefore, an object of the invention is to provide a lower cost alternative to a polyolefin clarifier containing 3,4-DMDBS alone exhibiting excellent clarifying capabilities for the same polyolefin articles and compositions. Another object of the invention is to provide a polyolefin composition or article exhibiting a haze measurement of below 10% comprising a clarifying combination of 3,4-DMDBS and MDBS.

Accordingly, this invention encompasses a polyolefin additive composition comprising a combination of both bis(3,4-dimethylbenzylidene) sorbitol and bis(4-methylbenzylidene) sorbitol. More specifically, this invention encompasses such a combination consisting of from 5 to 95% by weight of the total combination of bis(3,4-dimethylbenzylidene) sorbitol and from 5 to 95% by weight of the total combination of bis(4-methylbenzylidene) sorbitol. Finished solid articles of polyolefins, such as, preferably, though not necessarily, polypropylene, comprising such an additive composition are also contemplated within this invention. Furthermore, such an invention is also defined and thus encompasses a polyolefin nucleator composition comprising at least 1000 ppm of a mixture of compounds, wherein said compounds are bis(3,4-dimethylbenzylidene) sorbitol and bis(p-methylbenzylidene) sorbitol, wherein said polyolefin nucleator composition provides a crystallization onset temperature within a target polyolefin article formulation above the crystallization onset temperature provided for a comparative polyolefin article comprising the same polyolefin formulation but comprising bis(p-methylbenzylidene) sorbitol as its sole polyolefin nucleator component, wherein the concentration of said sole polyolefin nucleator component within said comparative polyolefin article is equivalent to the total concentration of the polyolefin nucleator mixture within said target polyolefin article. Also contemplated is a polyolefin nucleator composition comprising at least 1000 ppm of a combination of compounds, wherein said compounds are bis(3,4-dimethylbenzylidene) sorbitol and bis(p-methylbenzylidene) sorbitol, wherein said polyolefin nucleator composition provides a peak crystallization temperature within a target polyolefin article formulation above the peak crystallization temperature provided for a comparative polyolefin article comprising the same polyolefin formulation but comprising bis(p-methylbenzylidene) sorbitol as its sole polyolefin nucleator component, wherein the concentration of said sole polyolefin nucleator component within said comparative polyolefin article is equivalent to the total concentration of the polyolefin nucleator mixture within said target polyolefin article. Further contemplated is a polyolefin clarifier composition comprising at least 1000 ppm of a combination of nucleator compounds, wherein said compounds are bis(3,4-dimethylbenzylidene) sorbitol and bis(p-methylbenzylidene) sorbitol, wherein said polyolefin clarifier composition provides a haze measurement within a target polyolefin article formulation below the haze measurement provided for a comparative polyolefin article comprising the same polyolefin formulation but comprising bis(p-methylbenzylidene) sorbitol as its sole polyolefin clarifier component, wherein such haze measurements are made in accordance with ASTM Standard Test Method D1003-61, and wherein the concentration of said sole polyolefin nucleator component within said comparative polyolefin article is equivalent to the total concentration of the polyolefin nucleator mixture within said target polyolefin article. The importance of and definitions of such crystallization onset temperatures, peak crystallization temperatures, and haze measurements are discussed in greater detail below. Lastly, the invention encompasses a method of nucleating a polyolefin comprising the steps of (a) providing a nucleator composition comprising at least 1000 ppm of a combination of bis(3,4-dimethylbenzylidene) sorbitol and bis(4-methylbenzylidene) sorbitol; (b) providing a polyolefin formulation; (c) mixing said composition of step "a" with the polyolefin of step "b"; (d) melting said resultant mixture of step "c"; and allowing said molten mixture of step "d" to cool. Nowhere within the pertinent prior art is such a combination, polyolefin additive composition, polyolefin articles comprising such combinations and additives compositions, or methods of producing polyolefin articles taught or fairly suggested.

DETAILED DESCRIPTION OF THE INVENTION

The invention thus comprises basically both 3,4-DMDBS and MDBS in specific proportions. The combination of both compounds has been avoided in the past, as noted above, due to the difficulties in utilizing MDBS in a large range of applications and end-uses. Without the apparent ability to provide an acceptable clarifier composition including such a compound, the possibility of servicing only a limited market of end-users has thwarted widespread attempts of incorporating such a compound within different clarifying formulations. Without the desire or need to investigate the effects of such an inventive combination of compounds within a polyolefin clarifying formulation, production and analyses of such potential mixtures have been deemphasized.

However, with the need to provide lower cost alternatives to 3,4-DMDBS alone, as well as the availability of certain types of compounds to prevent MDBS degradation, neutralize degrading acids and other oxidants, and/or compounds which scavenge free degraded benzaldehyde, all within the target polyolefin, the potential for avoiding the aforementioned difficulties with organoleptic issues may potentially permit more widespread use of MDBS within a broader market of end-uses, particularly non-food contact applications. Such potential organoleptic improvements for MDBS containing polyolefins is rather limited, however, since the necessity of scavenging large amounts of degraded benzaldehydes requires the presence of an appreciable amount of extra solids within the target polyolefin itself. Such an addition is problematic since the increase in solids within the target polyolefin invariably affects the clarity and cost of the target formulation. Thus, polyolefins comprising all MDBS are still problematic on a widespread basis due to the difficulties in reducing haze and organoleptic problems simultaneously with such clarifying compounds. Hence, the development of the inventive combination of 3,4-DMDBS and MDBS as a synergistically active clarifying agent is of great importance within the clarified polyolefin industry.

As noted above, surprisingly, it has now been found that such a mixture of clarifiers exhibits a synergistic clarifying effect in polyolefin. As noted in TABLE 2, below, for random copolymer (RCP), for example, about 2000 ppm of 3,4-DMDBS provides a haze measurement of about 8% and MDBS at 2000 ppm of about 10% (all within, as one example, 50 mil plaques of injection molded RCP). By mixing the two compounds, for example, to about 1500 ppm 3,4-DMDBS and about 500 ppm MDBS, the resultant haze measurement is about 8.4% (much lower than for MDBS alone). Furthermore, a mixture of about 1600 ppm MDBS with about 400 ppm 3,4-DMDBS provides a haze measurement of about 7.9%. Thus, even though MDBS exhibits an appreciably higher haze measurement than 3,4-DMDBS, surprisingly the combination of the two different compounds provides a comparable haze result for 3,4-DMDBS alone.

Such a result is against commonly accepted practice. For example, as noted above, and without intending to be bound to any specific scientific theory, it appears that the DBS compound within a polyolefin appears to provide a fibrous network of nucleation sites for polyolefin crystal growth during cooling of the molten polymer. The network formed by 3,4-DMDBS alone accords what appears to be standard small spherulite sizes for low haze measurements. The network formed by MDBS produces larger average spherulite sizes, thereby producing high haze measurements. It is noted that all haze measurements noted herein include a standard deviation of +/−0.25 haze units.

Although haze is an important measurement to determine the effectiveness of certain clarifying agents, other characteristics exhibited by such agents, and transferred to the final polyolefin product are of great interest as well. For instance, crystallization is important in order to determine the time needed to form a solid from the molten polyolefin/DBS composition. The rate of crystallization is typically quantified by reporting the onset crystallization temperature, which defines the beginning of the crystallization process, and the peak crystallization temperature, which defines the temperature where the crystallization rate is highest. Both the onset crystallization temperature and the peak crystallization temperature are indicative of the crystallization process occurring in a polymer sample. In order to reduce the amount of time needed to form the final product, as well as to provide the most effective nucleation for the polyolefin, the best DBS compounds added will most likely, though not necessarily, also provide the highest peak crystallization temperature and the highest onset crystallization temperature.

The crystallization temperature exhibited by 3,4-DMDBS in RCP, for example, is greater than an entire degree above that for MDBS in RCP (114.1° C. to 112.9° C.). Thus, without intending to be bound to any specific scientific theory, it appears that the polypropylene crystals form more readily and quickly with 3,4-DMDBS due to the higher crystallization temperature exhibited thereby. However, (in the mixed systems) the addition of amounts of 3,4-DMDBS appear not only not to reduce the haze results from MDBS alone, but also increase both the peak crystallization and onset crystallization temperatures. It would be expected that the arrangement of polyolefin crystals would be more haphazard with a mixed clarifier system since the fibrous networks formed by the initial 3,4-DMDBS would seemingly produce different spherulite size crystals of polyolefin than would the MDBS network. Again, this appears not to be the case in this instance. The similarity in haze results to 3,4-DMDBS alone suggests that the polyolefin crystal growth remains uniform in effect. Such results are, again, highly unexpected in view of common understandings of nucleated and clarified polyolefins.

A similar phenomenom occurs with regard to the aforementioned crystallization onset temperatures. MDBS exhibits, in RCP, a crystallization onset temperature of about 117.1° C. at 2000 ppm, and 3,4-DMDBS exhibits, also in RCP at 2000 ppm, a crystallization onset temperature of about 118.6° C. With a combination of these two additives, the crystallization onset temperature is increased, surprisingly, to a level as high as almost 119° C. All crystallization and onset temperatures listed herein include a statistical error of +/−0.1° C.

Thus, it has been found that a composition of from 5–95% by weight of MDBS and from 5–95% by weight of 3,4-DMDBS, with a total of 100% for both components, provides the highly unexpected benefits as noted above, particularly when incorporated within a target polyolefin, preferably polypropylene. Preferably, such a mixture is from about 10–90% by weight MDBS and from about 10–90% by weight of 3,4-DMDBS; more preferably, about 20–90% by weight of MDBS and from about 10–80% by weight of 3,4-DMDBS; still more preferably, 25–90% MDBS, and 10–75% 3,4-DMDBS, and most preferably about 50–80% MDBS and about 20–50% 3,4-DMDBS. Such a combination may be incorporated within an additives package composition including other components, including, base polyolefin, and other compounds and formulations noted below in greater detail. Such an inventive combination, and compositions comprising such an inventive combination, may be present in any type of standard polyolefin additive form, including, without limitation, powder, prill, agglomerate, liquid suspension, and the like. Basically, any form may be exhibited by such a combination or composition including such combination made from blending, agglomeration, compaction, and/or extrusion. The total concentration of the inventive combination of nucleator compounds within the target polyolefin may be anywhere from about 1000 ppm to about 4000 ppm; preferably such a concentration is from about 1000 ppm to about 3500 ppm; more preferably is from about 1200 ppm to about 3000 ppm; still more preferably is from about 1500 ppm to about 3000 ppm; and most preferably from about 1500 ppm to about 2200 ppm.

Optional additives within the base composition comprising this inventive mixture may include plasticizers, antistatic agents, stabilizers, ultraviolet absorbers, and other similar standard polyolefin thermoplastic additives. Other additives may also be present within this composition, most notably antioxidants, antistatic compounds, perfumes, acid neutralizers, and the like. In particular, it is contemplated that certain organoleptic improvement additives be added for the purpose of permitting increased amounts of MDBS to be incorporated within the inventive combination, compositions thereof, and end-product polyolefin comprising such. The term "organoleptic improvement additive" is intended to encompass such compounds and formulations as antioxidants (to prevent degradation of both the polyolefin and possibly the target MDBS and/or 3,4-DMDBS), acid neutralizers (to prevent the ability of appreciable amounts of residual acids from attacking the DBS compounds), and benzaldehyde scavengers (such as hydrazides, hydrazines, and the like, to prevent the migration of foul tasting and smelling benzaldehydes to the target polyolefin surface). Such compounds and formulations can be added in any amounts in order to provide such organoleptic improvements as needed. However, the amounts should not appreciably affect the haze results for the target polyolefin itself. Thus, lower amounts on the order of from about 20 ppm to about 2,000 ppm of the total polyolefin component are desired.

The term polyolefin or polyolefin resin is intended to encompass any materials comprised of at least one polyolefin compound. Preferred examples include polypropylene, polyethylene, polybutylene, and any blends or copolymers thereof, whether high or low density in composition. The term thermoplastic is well known in the art to mean a polymeric material which will melt upon exposure to sufficient heat but will retain its solidified state, but not prior shape (without use of a mold), upon sufficient cooling. The nucleated polyolefin is intended to be utilized as, for instance and not by limitation, medical devices, such as syringes, intravenous supply containers, and blood collection apparati; pipes and tubes; standard storage containers; food packages; liquid containers, such as for drinks, medicines, shampoos, and the like; apparel cases; microwaveable articles; shelves; cabinet doors; mechanical parts; automobile parts; and any article where the effects of nucleation may be advantageous.

The inventive nucleator and/or clarifier compositions are also defined in terms of their ability to provide improved crystallization onset temperatures, peak crystallization temperatures, and haze measurements within polyolefin article formulations above such quantifiable properties available through the sole utilization of bis(p-methylbenzylidene) sorbitol as a nucleator and/or clarifier within the same polyolefin article formulation and at the same total concentration as the inventive nucleator combination, as noted above. The term "same polyolefin article formulation" in this context intended to define the same base polyolefin content as used to produce the comparable polyolefin articles with the inventive compositions incorporated therein, including the same manufacturing process parameters (e.g., melting temperatures, molder barrel temperatures, cooling rates and temperatures, and the like). It would be well appreciated by the ordinarily skilled artisan that such a term does not connote the same exact polyolefin article itself. Thus, in comparison with standard polyolefin article formulations of the same base poyolefin content but with bis(p-methylbenzylidene) sorbitol as the sole nucleating/clarifying additive, the inventive compositions provide increased crystallization onset temperatures and peak crystallization temperatures and decreased haze measurements where the concentration of the sole polyolefin nucleator component a comparative polyolefin article is equivalent to the total concentration of the polyolefin nucleator mixture within the inventive target polyolefin article.

PREFERRED EMBODIMENTS OF THE INVENTION

Examples of particularly preferred additive compositions comprising mixtures of 3,4-DMDBS and MDBS as well as polyolefin articles comprising such mixtures are presented below.

Production of Inventive DBS Mixtures

The specific DBS mixtures were comprised of powders of the individual DBS compounds which were then mixed together physically in powder form in the proportions listed below. DBS, itself, indicates dibenzylidene sorbitol; EDBS indicates bis(p-ethylbenzylidene) sorbitol; and TDBS indicates 1,3;2,4-bis(5', 6', 7', 8'-tetrahydro-2-naphthylidene) sorbitol.

TABLE 1

Proportions Of Inventive DBS Mixtures

| Ex. | 3,4-DMDBS (ppm) | MDBS (ppm) | DBS (ppm) | EDBS (ppm) | TDBS (ppm) |
|---|---|---|---|---|---|
| 1 | 1750 | 250 | 0 | 0 | 0 |
| 2 | 1500 | 500 | 0 | 0 | 0 |
| 3 | 1250 | 750 | 0 | 0 | 0 |
| 4 | 1000 | 1000 | 0 | 0 | 0 |
| 5 | 750 | 1250 | 0 | 0 | 0 |
| 6 | 600 | 1400 | 0 | 0 | 0 |
| 7 | 500 | 1500 | 0 | 0 | 0 |
| 8 | 400 | 1600 | 0 | 0 | 0 |
| 9 | 300 | 1700 | 0 | 0 | 0 |
| 10 | 250 | 1750 | 0 | 0 | 0 |
| 11 | 200 | 1800 | 0 | 0 | 0 |
| 12 | 100 | 1900 | 0 | 0 | 0 |
| 13 | 1250 | 1250 | 0 | 0 | 0 |
| (Comparatives) | | | | | |
| 14 | 2000 | 0 | 0 | 0 | 0 |
| 15 | 0 | 2000 | 0 | 0 | 0 |
| 16 | 1000 | 0 | 1000 | 0 | 0 |
| 17 | 500 | 0 | 1500 | 0 | 0 |
| 18 | 0 | 0 | 2000 | 0 | 0 |
| 19 | 1000 | 0 | 0 | 1000 | 0 |
| 20 | 400 | 0 | 0 | 1600 | 0 |
| 21 | 0 | 0 | 0 | 2000 | 0 |
| 22 | 0 | 1250 | 0 | 0 | 1250 |
| 23 | 0 | 0 | 0 | 0 | 2500 |
| 24 | 2500 | 0 | 0 | 0 | 0 |
| 25 | 0 | 2500 | 0 | 0 | 0 |

Production of Clarified Polypropylene with the Inventive DBS Mixtures

One kilogram batches of target polypropylene were produced in accordance with the following table:

POLYPROPYLENE COMPOSITION TABLE

| Component | Amount |
|---|---|
| Polypropylene random copolymer flake (3% ethylene) | 1,000 g |
| Irganox ® 1010, Primary Antioxidant (from Ciba) | 500 ppm |
| Irgafos ® 168, Secondary Antioxidant (from Ciba) | 1000 ppm |
| Calcium Stearate, Acid Scavenger | 800 ppm |
| Clarifying compounds or compositions | as noted |

The base resin (random copolymer, hereinafter "RCP") and all additives were weighed and then blended in a Welex high-intensity mixer for 1 minute at about 1600 rpm. All samples were then melt compounded on a Killion single screw extruder at a ramped temperature from about 204° C. to 232° C. through four heating zones. The melt temperature upon exit of the extruder die was about 246° C. The screw had a diameter of 2.54 cm and a length/diameter ratio of 24:1. Upon melting the molten polymer was filtered through a 60 mesh (250 micron) screen. Plaques of the target polypropylene were then made on an Arburg 25 ton injection molder. The molder barrel was set at a temperature of 220° C. The plaques had dimensions of about 51 mm×76 mm×1.27 mm made from a mirror-polished mold (SPI 1). The mold cooling circulating water was controlled at a temperature of 25° C. After allowing the plaques to age for 24 hours at room temperature, haze values were measured according to ASTM Standard Test Method D1003-61 "Standard Test Method for Haze and Luminous Transmittance of Transparent Plastics" using a BYK Gardner Hazegard Plus.

A Perkin-Elmer DSC7 calibrated with indium was used to measure the peak crystallization temperature and the onset crystallization temperature of the polymer. The specific polyolefin/DBS mixture composition was heated from 60° C. to 220° C. at a rate of 20° C. per minute to produce a molten formulation and held at the peak temperature for 2 minutes. At that time, the temperature was then lowered at a rate of 20° C. per minute until it reach the starting temperature of 60° C. The peak crystallization temperature of the polymer was thus measured as the peak maximum during the crystallization exotherm. The onset crystallization temperature of the polymer, which indicates the temperature at the beginning of the crystallization process, was calculated using the default settings of Perkin Elmer's Pyris 3.81 software.

The following Table lists the haze values and crystallization temperatures for the plaques prepared with the mixtures of TABLE 1 (an asterisk indicates no measurements were taken for those samples):

TABLE 2

Haze Values and Crystallization and Onset Temperatures for Inventive Plaques

| Plague # (TABLE 1) | Haze Value | Peak Crystallization Temp. | Onset Crystallization Temp. |
|---|---|---|---|
| 1 | 8.0 | 113.6° C. | 118.1° C. |
| 2 | 8.4 | 113.6° C. | 117.9° C. |
| 3 | 8.3 | 113.7° C. | 118.1° C. |
| 4 | 7.9 | 113.7° C. | 118.2° C. |

TABLE 2-continued

Haze Values and Crystallization and
Onset Temperatures for Inventive Plaques

| Plaque # (TABLE 1) | Haze Value | Peak Crystallization Temp. | Onset Crystallization Temp. |
|---|---|---|---|
| 5 | 8.0 | 114.2° C. | 118.8° C. |
| 6 | 8.0 | 114.0° C. | 118.9° C. |
| 7 | 8.1 | 113.9° C. | 118.9° C. |
| 8 | 7.9 | 113.9° C. | 118.8° C. |
| 9 | 8.2 | 113.7° C. | 118.5° C. |
| 10 | 8.3 | 113.6° C. | 118.3° C. |
| 11 | 8.4 | 113.6° C. | 118.1° C. |
| 12 | 8.7 | 113.1° C. | 117.3° C. |
| 13 (Comparatives) | 7.0 | * | * |
| 14 | 8.0 | 114.1° C. | 118.6° C. |
| 15 | 10.1 | 112.9° C. | 117.1° C. |
| 16 | 12.2 | 112.6° C. | 116.8° C. |
| 17 | 13.8 | 111.4° C. | 115.3° C. |
| 18 | 21.5 | 109.2° C. | 112.5° C. |
| 19 | 11.1 | 113.3° C. | 117.7° C. |
| 20 | 12.0 | 112.6° C. | 117.2° C. |
| 21 | 12.7 | 113.5° C. | 118.2° C. |
| 22 | 9.1 | * | * |
| 23 | 6.9 | * | * |
| 24 | 6.9 | * | * |
| 25 | 8.3 | * | * |

The plaques produced with the inventive DBS mixtures, rather than the individual DBS compounds themselves, thus exhibited comparable haze measurements and crystallization temperatures, all at a lower cost due to the added amount of less expensive MDBS within the final article.

Having described the invention in detail it is obvious that one skilled in the art will be able to make variations and modifications thereto without departing from the scope of the present invention. Accordingly, the scope of the present invention should be determined only by the claims appended hereto.

That which is claimed is:

1. A polyolefin additive composition comprising a combination of two compounds, wherein said combination consists of from 10 to 88.5% by weight of the total combination of bis(3,4-dimethylbenzylidene) sorbitol and from 12.5 to 90% by weight of the total combination of bis(p-methylbenzylidene) sorbitol.

2. The polyolefin additive composition of claim 1 wherein said combination consists of from 10 to 80% of bis(3,4-dimethylbenzylidene) sorbitol and from 20 to 90% of bis(p-methylbenzylidene) sorbitol by weight of the total combination.

3. The polyolefin additive composition of claim 1 wherein said combination consists of from 10 to 75% of bis(3,4-dimethylbenzylidene) sorbitol and from 25 to 90% of bis(p-methylbenzylidene) sorbitol by weight of the total combination.

4. The polyolefin additive composition of claim 1 wherein said combination consists of from 20 to 50% of bis(3,4-dimethylbenzylidene) sorbitol and from 50 to 80% of bis(p-methylbenzylidene) sorbitol by weight of the total combination.

5. The polyolefin additive composition of claim 1 further comprising at least one organoleptic improvement additive.

6. The polyolefin additive composition of claim 2 further comprising at least one organoleptic improvement additive.

7. The polyolefin additive composition of claim 3 further comprising at least one organoleptic improvement additive.

8. The polyolefin additive composition of claim 4 further comprising at least one organoleptic improvement additive.

9. A solid polyolefin article comprising the additive composition of claim 1.

10. A solid polyolefin article comprising the additive composition of claim 2.

11. A solid polyolefin article comprising the additive composition of claim 3.

12. A solid polyolefin article comprising the additive composition of claim 4.

13. A solid polyolefin article comprising the additive composition of claim 5.

14. A solid polyolefin article comprising the additive composition of claim 7.

15. A solid polyolefin article comprising the additive composition of claim 8.

16. The solid polyolefin article of claim 9 wherein said polyolefin comprises at least polypropylene.

17. The solid polyolefin article of claim 16 wherein said polypropylene is a random copolymer of polypropylene.

18. The solid polyolefin article of claim 17 wherein said random copolymer exhibits at least some ethylene content.

19. A polyolefin nucleator composition comprising at least 1000 ppm of a mixture of compounds, wherein said compounds are bis(3,4-dimethylbenzylidene) sorbitol and bis(p-methylbenzylidene) sorbitol, wherein said polyolefin nucleator composition provides a crystallization onset temperature within a target polyolefin article formulation above the crystallization onset temperature provided for a comparative polyolefin article comprising the same polyolefin formulation but comprising bis(p-methylbenzylidene) sorbitol as its sole polyolefin nucleator component, wherein the concentration of said sole polyolefin nucleator component within said comparative polyolefin article is equivalent to the total concentration of the polyolefin nucleator mixture within said target polyolefin article.

20. A polyolefin nucleator composition comprising at least 1000 ppm of a combination of compounds, wherein said compounds are bis(3,4-dimethylbenzylidene) sorbitol and bis(p-methylbenzylidene) sorbitol, wherein said polyolefin nucleator composition provides a peak crystallization temperature within a target polyolefin article formulation above the peak crystallization temperature provided for a comparative polyolefin article formulation comprising the same polyolefin article formulation but comprising bis(p-methylbenzylidene) sorbitol as its sole polyolefin nucleator component, wherein the concentration of said sole polyolefin nucleator component within said comparative polyolefin article is equivalent to the total concentration of the polyolefin nucleator mixture within said target polyolefin article.

21. A polyolefin clarifier composition comprising at least 1000 ppm of a combination of nucleator compounds, wherein said compounds are at least bis(3,4-dimethylbenzylidene) sorbitol and bis(p-methylbenzylidene) sorbitol, wherein said polyolefin clarifier composition provides a haze measurement within a target polyolefin article formulation below the haze measurement provided for a comparative polyolefin article comprising the same polyolefin formulation but comprising bis(p-methylbenzylidene) sorbitol as its sole polyolefin clarifier component, wherein such haze measurements are made in accordance with ASTM Standard Test Method D1003-61, and wherein the concentration of said sole polyolefin nucleator component within said comparative polyolefin article is equivalent to the total concentration of the polyolefin nucleator mixture within said target polyolefin article.

22. A method of nucleating a polyolefin comprising the steps of:

(a) providing a nucleator composition comprising at least 1000 ppm of a combination consisting of from 10 to 88.5% of bis(3,4-dimethylbenzylidene) sorbitol and from 12.5 to 90% of bis(p-methylbenzylidene) sorbitol, wherein such percentages are based upon the total weight of the combination of both compounds within said nucleator composition;

(b) providing a polyolefin formulation;
(c) mixing said composition of step "a" with the polyolefin of step "b";
(d) melting said resultant mixture of step "c"; and allowing said molten mixture of step "d" to cool.

* * * * *

UNITED STATES PATENT AND TRADEMARK OFFICE
CERTIFICATE OF CORRECTION

PATENT NO. : 6,586,007 B2
DATED : July 1, 2003
INVENTOR(S) : K. David Lake, Jr., Nathan A. Mehl and Christopher Thomas Kochanowicz It is certified that error appears in the above-identified patent and that said Letters Patent is hereby corrected as shown below:

<u>Title page, Item [54] and Column 1, lines 1-4,</u>
Delete the title "POLYOLEFIN ADDITIVE COMPOSITION COMPRISING 3,4-DIMETHYL DIBENZYLIDENE SORBITOL AND RHO-METHYL DIBENZYLIDENE" and insert the title -- **POLYOLEFIN ADDITIVE COMPOSITION COMPRISING 3,4-DIMETHYL DIBENZYLIDENE SORBITOL AND *p*-METHYL DIBENZYLIDENE SORBITOL** --.

Signed and Sealed this

Eleventh Day of November, 2003

JAMES E. ROGAN
*Director of the United States Patent and Trademark Office*